US006897459B2

(12) United States Patent
Albou

(10) Patent No.: US 6,897,459 B2
(45) Date of Patent: May 24, 2005

(54) COMPACT ELLIPTICAL INFRARED LIGHT UNIT FOR A MOTOR VEHICLE

(75) Inventor: Pierre Albou, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 179 days.

(21) Appl. No.: 09/870,765

(22) Filed: May 31, 2001

(65) Prior Publication Data

US 2001/0050344 A1 Dec. 13, 2001

(30) Foreign Application Priority Data

May 31, 2000 (FR) .......................................... 00 07001

(51) Int. Cl.$^{7}$ .............................................. B60Q 1/14

(52) U.S. Cl. ................ 250/504 R; 250/318; 250/498.1

(58) Field of Search ........................... 250/318, 504 R, 250/498.1, 497, 497.1; 382/459, 61

(56) References Cited

U.S. PATENT DOCUMENTS

| | | | | |
|---|---|---|---|---|
| 4,290,043 A | * | 9/1981 | Kaplan | 340/984 |
| 4,692,798 A | | 9/1987 | Seko et al. | |
| 5,124,549 A | * | 6/1992 | Michaels et al. | 250/237 R |
| 5,339,226 A | * | 8/1994 | Ishikawa | 362/539 |
| 5,373,424 A | * | 12/1994 | Ishikawa | 362/538 |
| 5,448,453 A | * | 9/1995 | Oshio | 362/510 |
| 6,186,651 B1 | * | 2/2001 | Sayers et al. | 362/512 |
| 6,312,147 B2 | * | 11/2001 | Eichler | 362/539 |

FOREIGN PATENT DOCUMENTS

| | | |
|---|---|---|
| EP | 0 455 524 B1 | 11/1991 |
| EP | 0 479 634 B1 | 4/1992 |
| EP | 0 936 107 B1 | 8/1999 |
| FR | 2652317 | 3/1991 |
| FR | 2756237 | 5/1998 |

OTHER PUBLICATIONS

French Search Report dated Feb. 1, 2001.

* cited by examiner

*Primary Examiner*—Nikita Wells
*Assistant Examiner*—Anthony Quash
(74) *Attorney, Agent, or Firm*—Morgan & Finnegan, L.L.P.

(57) ABSTRACT

An infrared light unit for a motor vehicle includes a light source, a reflector having two focal regions and a lens. The light source is in one of the focal regions and produces a pool of reflected light in the other focal region, and the lens converts this pool of light into a beam projected on the road. The light unit includes, between the reflector and the lens, a filter which is opaque to visible light and transparent to infrared light, and which is movable between a position out of the path of light going from the reflector to the lens, and an active position in which all or most of the light going from the reflector to the lens passes through the filter.

9 Claims, 4 Drawing Sheets

COMPACT ELLIPTICAL INFRARED LIGHT UNIT FOR A MOTOR VEHICLE

FIELD OF THE INVENTION

The present invention relates to light units for motor vehicles of the type including a filter which is opaque to visible radiation but transparent to infrared radiation. The term "light unit" is to be understood to mean a headlight or other device for providing illumination.

BACKGROUND OF THE INVENTION

Such light units are known which are in addition arranged to enable the filter to be displaced between an active position and a retracted position. The front face of these light units has a large surface area, which is a disadvantage.

DISCUSSION OF THE INVENTION

The object of the present invention is to mitigate this disadvantage, that is to say to propose a light unit with a movable infrared filter, but which also has a reduced front surface area.

According to the invention, a light unit for a motor vehicle comprising a light source, a reflector with two focal regions and a lens, the light source being placed in one of the two focal regions so as to produce a pool of reflected light in the other focal region, and the lens being arranged to convert this pool of light into a beam projected on the road, is characterised in that the light unit comprises, between the reflector and lens, a filter which is opaque to visible light and transparent to infrared radiation, the filter being movable between a position spaced away from the light passing from the reflector to the lens, and a position in which a substantial part of the light passing from the reflector to the lens goes through the filter.

According to various preferred but optional features of the invention, which may be taken individually or in any technically possible combination:

- the light unit includes a member for holding the filter, which is adapted to deform under the effect of thermal deformation of the filter;
- the light source is placed in the internal focal region of the reflector, and in that the filter is placed downstream of the pool of reflected light;
- the filter holding means are arranged to permit displacement of the filter to a position in which it is substantially in a shadow zone corresponding to the optical image of a lamp hole in the reflector;
- the light unit includes a filter holding means for carrying the filter, the filter holding means being arranged to allow displacement of the filter to a position in which it extends, by its surface, along an edge of the light flux;
- such a filter holding means is provided and consists of means for rotating the filter;
- the filter rotating means comprise a pivot having an axis situated downstream of the active position of the filter in the direction of propagation of the light;
- the filter has in its active position a location and an extent which are so chosen that the filter allows some light radiation to pass from the reflector to the lens without passing through the filter;
- the lens defines zones which are arranged to disorganize a light flux, the said zones being located in the path of rays passing from the reflector to the lens without passing through the filter;
- the said disorganizing zones are annular regions on the lens.

Further features and advantages of the invention will appear more clearly on a reading of the following detailed description of some preferred embodiments of the invention, which is given by way of non-limiting example only and with reference to the accompanying drawings.

DESCRIPTION OF PREFERRED EMBODIMENTS OF THE INVENTION

Figure 1:
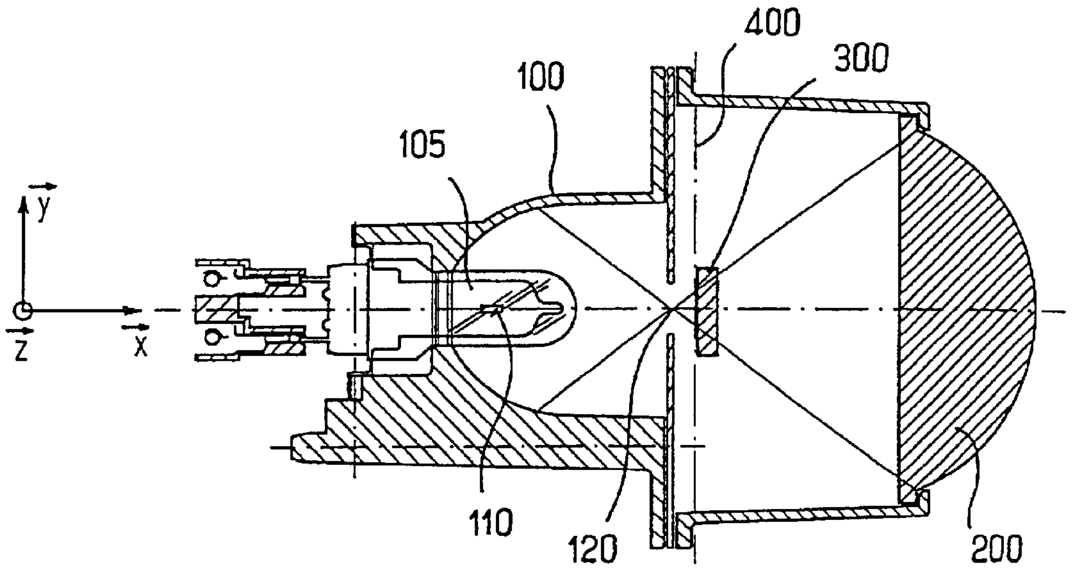
FIG. 1 is a view, in vertical cross section, of a motor vehicle light unit in the form of a headlight according to the invention, in which the filter is shown in an active position.

The general structure of the light units shown in FIGS. 1 to 9 includes a reflector 100 of the ellipsoidal or so-called elliptical type, with an internal focus 110 and an external focus 120, a lens 200, the focus of which is coincident with the external focus 120 of the reflector 100, and a light source 105 which is located on the internal focus 110 of the reflector 100.

Ellipsoidal surfaces are typically surfaces which are defined mathematically from two focal zones which will be called here the foci 110 and 120, but which in practice are not true points but have a slight extent in at least one dimension. This extent embraces the filament of the light source in the case of the internal focal zone 110, and it forms a pool of light in the case of the external focal zone 120. The mathematically defined surface is therefore an approximate ellipsoid.

The rays emitted by the source after being reflected on the elliptical reflector 100 increase in the vicinity of the external focus 120. The light rays arriving on the lens 200 therefore seem to be emitted by a light source of small dimensions located at the focus 120. The rays are then projected in front of the vehicle, to form a beam in which the light distribution is appropriate for the "main beam" function of the headlight.

As can be seen in FIGS. 1 to 9, a movable filter 300 of small dimensions is in an active position in which it is placed in the vicinity of the external focus 120 of the reflector, so that it intercepts substantially all of the light radiation due to the concentration of the rays at this location. In this example the filter 300 is located downstream of the external focus 120, though it could be disposed upstream or exactly at the external focus 120, with reference to the path of the light rays. Thus positioned, the filter 300 intercepts nearly all of the light which is propagated from the reflector 100 to the lens 200, while being positioned in a zone of large volume as compared with the size of the filter itself. It is thus easily possible to position improved holding and displacement means in this zone.

Having regard to the general geometry of the light unit, the positioning of the filter in the vicinity of the external focus 120 also enables the filter 300 to have positions which are close to the active position and which do not interfere with any light radiation, so that as a result they can be adopted as inactive positions of the filter 300.

In this example the filter 300 consists of a small square plate. It is located at right angles to the main projection axis.

Figure 2:
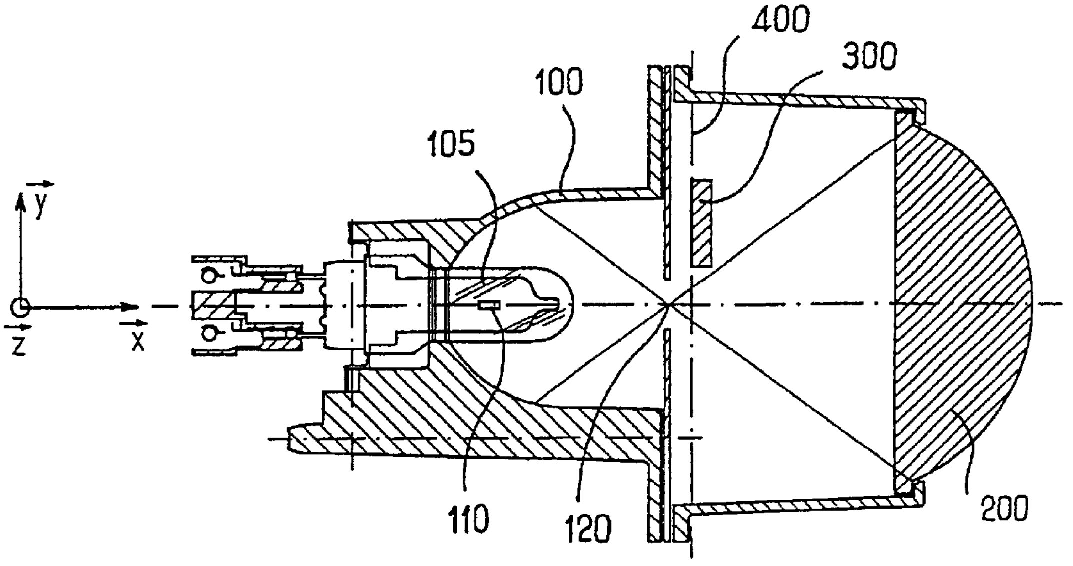
FIG. 2 is a vertical cross section of the same light unit with the filter retracted.

FIGS. 1 and 2 show a first embodiment of this arrangement, in which the filter 300 is movable in vertical straight line movement in the direction y. In this version, the filter 300 can be guided on a rail 400 which is indicated in the Figure by a phantom line. It may for example be driven by an electric motor or an electromagnet.

The filter 300 is preferably lodged within a frame (not shown) made of a flexible material, for example sheet metal. This frame is deformable under the effect of deformations of the filter without damaging the filter. In another version, the filter 300 is held by means of suitable elastic return means, which extend or bend under the effect of deformations of the filter 300.

Figure 3:
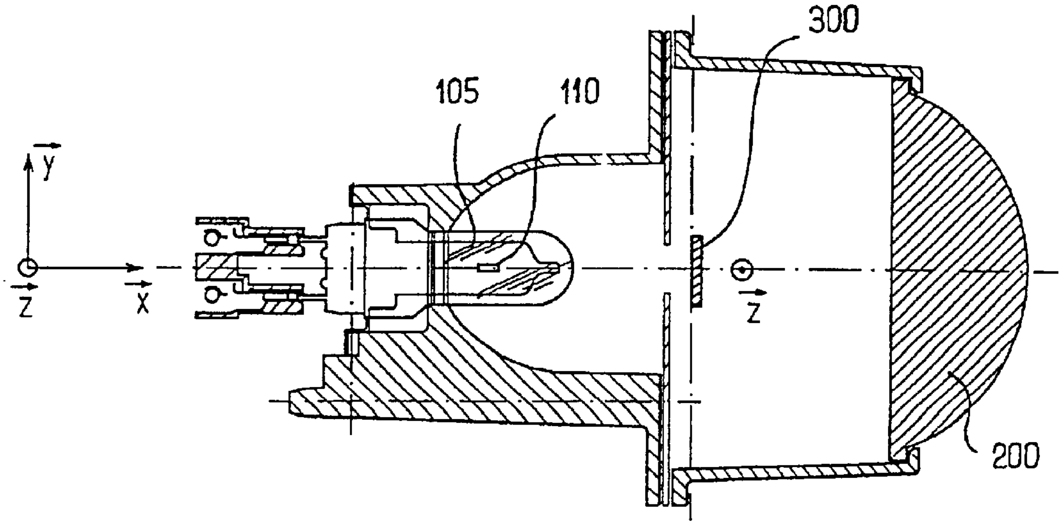
FIG. 3 is a vertical cross section of a light unit according to the invention in which the filter is mounted for horizontal straight line motion transverse to the radiated light.

In a further version indicated in FIG. 3, the straight line movement of the filter may take place in a horizontal direction Z which is also transverse to the main direction of propagation.

Figure 4:
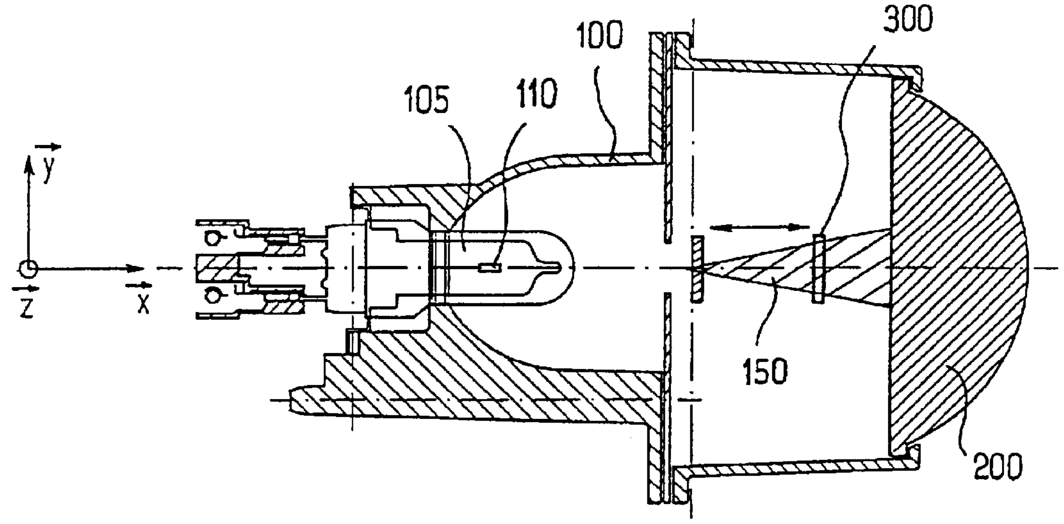
FIG. 4 is a vertical cross section of a light unit according to the invention in which the filter is mounted for horizontal straight line movement parallel to the radiated light.

In FIG. 4, the filter 300 is mounted for straight line movement on a rail parallel to the main direction of propagation. In its effaced position, the filter is far enough in advance of the external focus 100 to interfere only slightly with the light.

In this connection, elliptical projectors typically produce a shadow cone 150 which corresponds to the hole in the base of the reflector in which the lamp is held. This hole, which is therefore occupied by the non-reflective lamp base components, is the cause of what is effectively an absence of light radiation within the cone, which typically surrounds the main propagation axis. The cone 150 generally defines an aperture of small angle. However, the dimensions of the filter 300, disposed in this way, are particularly small, and the filter is put virtually entirely into the interior of this cone by simply displacing the filter towards the wide end of the cone 150.

Figure 5:
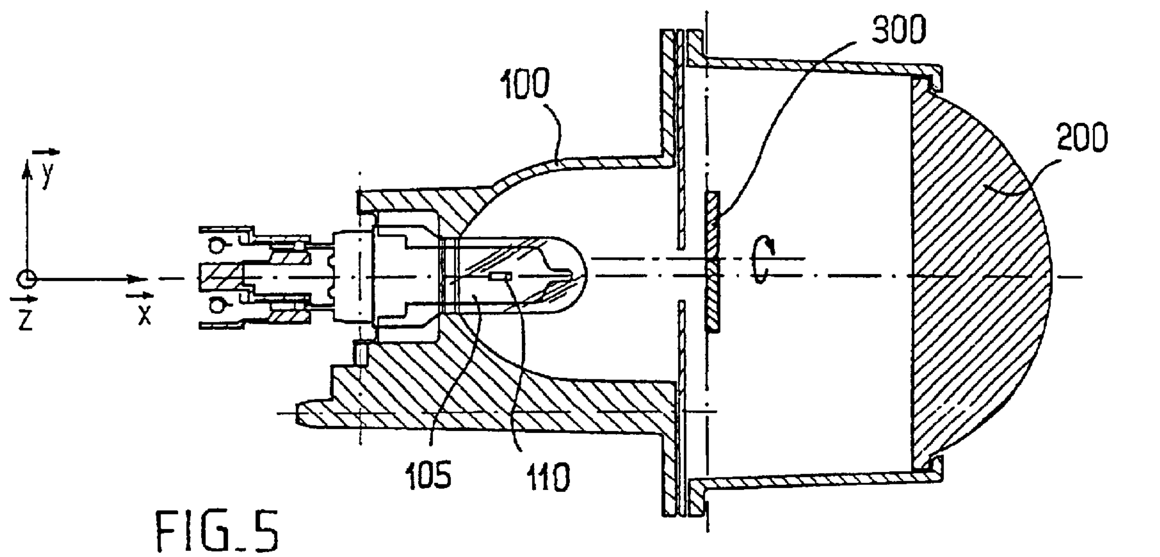
FIG. 5 is a vertical cross section of a light unit according to the invention in which the filter is mounted for rotation about a horizontal axis parallel to the direction of the radiated light.
Figure 6:
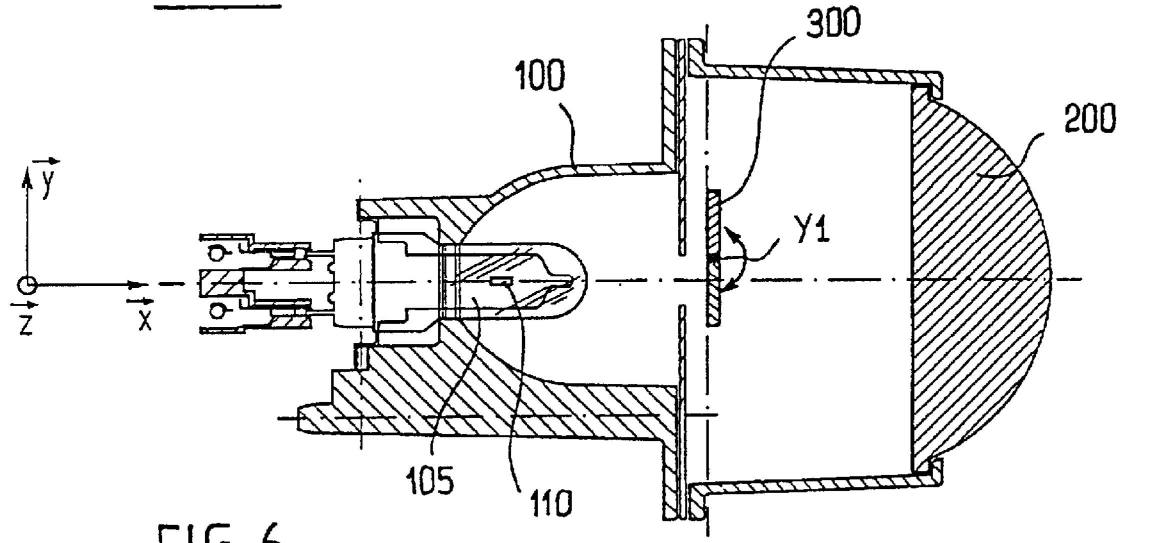
FIG. 6 is a vertical cross section of a headlight according to the invention in which the filter is mounted for rotation about a vertical axis transverse to the direction of the radiated light.

In another embodiment shown in FIGS. 5 and 6, the filter 300 is rotatable about a horizontal axis. In FIG. 5, the axis of rotation is parallel to the main direction of propagation of the light, In FIG. 6, the axis y1 is transverse to the propagation direction of the light flux.

The axis of rotation y1 extends simply along one edge of the filter, so that the latter is effaced on the side of the light radiation, which is particularly concentrated in the vicinity of the focus 120.

Figure 7:
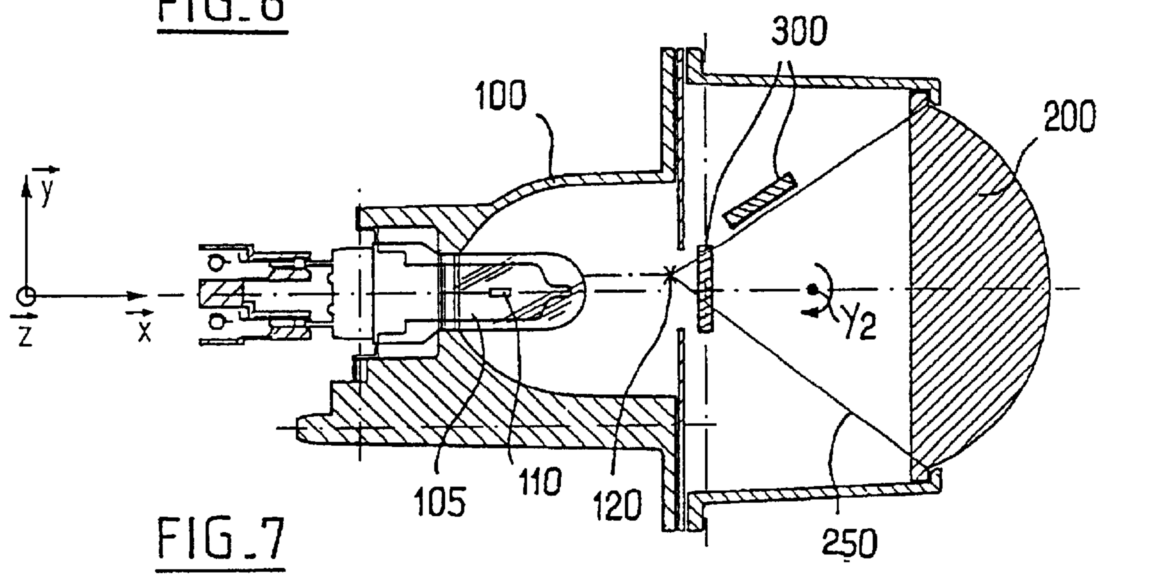
FIG. 7 is a vertical cross section of a headlight according to the invention in which the axis is so located that the filter bounds the internal path of the light when it is retracted.

In the embodiment shown in FIG. 7, the axis of rotation y2 is horizontal and in front of the active position of the filter. FIG. 7 shows the path of the light between the second focus 120 and the lens 200. The light describes at this position a cone 250, the apex of which is at the second focus 120, with the wide end, or base, of the cone being on the periphery of the lens 200. The axis y2 is placed sufficiently in front of the active position of the filter 300 for a rotation through about 60° to be enough for the filter 300 to be brought out of the cone of light 250.

More precisely, the axis y2 is however close enough to the filter 300 for the filter 300 to be close to the boundary of the cone 250, parallel to its conical envelope.

More generally, such retracting movement which puts the filter into a position directly bounding the flux of internal light is found to be at the same time very effective in optical terms, and is particularly satisfactory in terms of size, because the direct bounding of the cone of light is found to be a very advantageous working zone for the filter 300 because its extent and thickness are most suitable.

Figure 8:
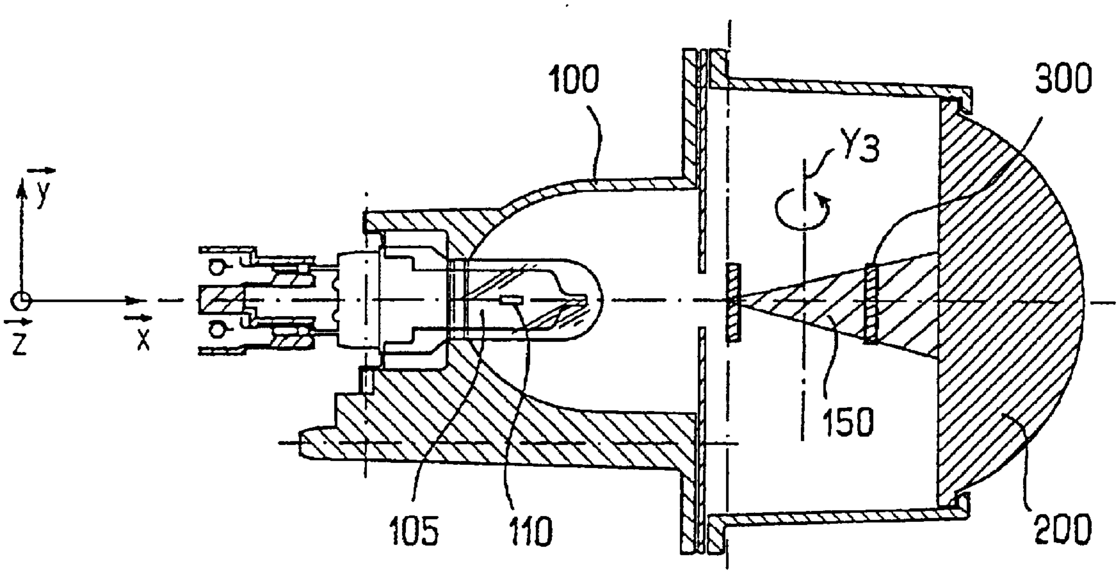
FIG. 8 is a vertical cross section of a light unit according to the invention in which the filter is mounted for rotation about a horizontal axis transverse to the direction of the radiated light.

Reference is now made to FIG. 8, in which the axis of rotation y3 is vertical and is offset in front of the active position of the filter. The means for displacing the filter cause the latter to rotate through 180°, so that the filter, when retracted, is not only rotated but is also displaced forward until it is placed within the shadow cone 150 mentioned above.

The axis y3 is for example located transversely to the centre of the radiated light, at the intersection with the main axis of the light radiated by the light unit. Thus, between the active and inactive positions the filter seems simply to have been moved in a straight line.

The invention does of course extend to any type of motion of the filter, that is to say using any degrees of freedom, for example rotation about any one of three main axes of rotation and/or straight line movement along any one of these three axes.

Figure 9:
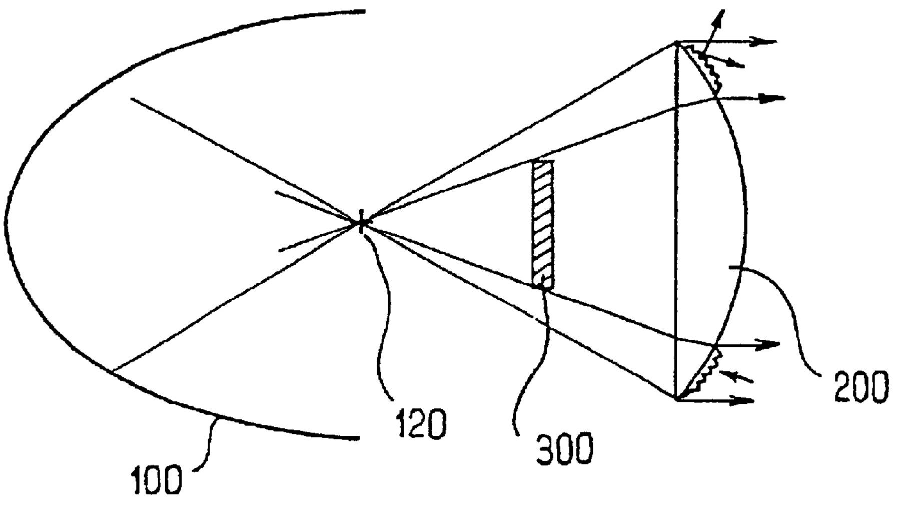
FIG. 9 is a vertical cross section of a light unit according to the invention which includes a lens for diffusing rays which have passed from the reflector to the lens without going through the activated filter.

FIG. 9, to which reference is now made, shows a filter 300 placed slightly downstream of the external focal zone 120. In this arrangement, the filter 300 has an extent and a position such that it does not intersect all of the light. Some of the rays travel to the lens 200 by passing outside the edges of the filter 300. These rays impinge the lens 200 at the periphery of the latter. Such rays are used in order to produce in front of the vehicle a slight amount of illumination in visible light (ordinary light) which swallows up any parasitic red tinge due to the presence of the filter 300.

To accentuate visibility of the white light thus formed in the peripheral zone of the lens, without dazzling drivers travelling in the opposite direction, an arrangement is adopted in this annular peripheral zone of the lens 300 which is adapted to accentuate diffusion of the light, that is to say to disorganize the rays (i.e. with a lantern effect).

For example, the lens may have in this zone unpolished glass or a slight frosting. Thus, diffusion of the white light elements at the periphery of the lens produces lateral photometry of the lantern type which gives these light units a white appearance, without however (preferably) having high intensity on the axis. In this way, steady lighting can be obtained which is close to the maximum authorised for a lantern (60 candela), or of the so-called “day running light” type.

More generally, arrangements are preferably adopted in which control of leakage of white light out of the filter is arranged, and these leakages are preferably diffused on leaving the light unit. In this way, the use of a white lantern constituted by a second light source is avoided.

What is claimed is:

1. A motor vehicle light unit comprising: a reflector defining two focal regions, one focal region being an internal focal region and the other being an external focal region, the reflector having a defined surface of an approximate ellipsoid; a light source located in said internal focal region in such a way as to produce a pool of reflected light in said external focal region; and a lens in front of said external focal region for converting said pool of light into a beam and for projecting said beam forward from the light unit, wherein the light unit further includes a filter movably positioned between the reflector and the lens, so that said filter is located downstream of the external focal region, the filter being opaque to visible light and transparent to only infrared light, and filter-carrying means mounting said filter for moving the filter between a first position out of the path of the light passing from the reflector to the lens, and a second position in which the filter intercepts a substantial part of said light passing from the reflector to the lens.

2. A light unit according to claim 1, further including a member carrying the said filter and adapted for deformation under the effect of thermal deformations of the filter.

3. A light unit according to claim 1, wherein the reflector is disposed in relation to the lens in such a way as to propagate light towards the lens in a stream of light defining an edge, the filter-carrying means being arranged to displace the filter to a position in which a surface of the filter extends along a said edge of the stream of light.

4. A light unit according to claim 1, wherein the reflector defines a lamp hole, the light source being a lamp placed in said lamp hole whereby to produce a shadow zone corresponding to the optical image of the lamp hole, the filter-carrying means being arranged to displace the filter to a position substantially in the said shadow zone.

5. A light unit according to claim 4, wherein the said filter-carrying means consist of means for positioning the filter.

6. A light unit according to claim 5, wherein the filter positioning means include a pivot defining an axis downstream of the said second position of the filter with respect to the direction of propagation of the light.

7. A light unit according to claim 1, defining said second filter position, and an extent of the filter itself, so that, when the filter is in said second position, some of the light radiation from the reflector to the lens bypasses the filter.

8. A light unit according to claim 7, wherein the lens defines zones for disorganizing a light stream, the said zones being located in the path of rays passing from the reflector to the lens and bypassing the filter.

9. A light unit according to claim 8, wherein the said disorganizing zones are defined in annular regions of the lens.

* * * * *